(12) United States Patent
Yang et al.

(10) Patent No.: US 11,099,318 B2
(45) Date of Patent: Aug. 24, 2021

(54) HOUSING FOR DISPLAY MODULE, DISPLAY MODULE AND ASSEMBLY METHOD OF DISPLAY MODULE

(71) Applicants: HEFEI BOE VISION-ELECTRONIC TECHNOLOGY CO., LTD., Anhui (CN); BOE TECHNOLOGY GROUP CO., LTD., Beijing (CN)

(72) Inventors: Zhou Yang, Beijing (CN); Yurong Cao, Beijing (CN); Kai Yang, Beijing (CN); Chuanyin Zhou, Beijing (CN)

(73) Assignees: HEFEI BOE VISION-ELECTRONIC TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 249 days.

(21) Appl. No.: 16/454,467

(22) Filed: Jun. 27, 2019

(65) Prior Publication Data

US 2020/0103584 A1 Apr. 2, 2020

(30) Foreign Application Priority Data

Sep. 30, 2018 (CN) .......................... 201821610622.6

(51) Int. Cl.
*G02B 6/00* (2006.01)
*F21V 8/00* (2006.01)
*G02F 1/1333* (2006.01)

(52) U.S. Cl.
CPC ......... *G02B 6/0088* (2013.01); *G02B 6/0055* (2013.01); *G02B 6/0065* (2013.01); *G02F 1/133308* (2013.01); *G02F 1/133314* (2021.01); *G02F 1/133317* (2021.01)

(58) Field of Classification Search
CPC .. G02B 6/0055; G02B 6/0065; G02B 6/0088; G02F 1/133308; G02F 1/133314
See application file for complete search history.

(56) References Cited

U.S. PATENT DOCUMENTS

| | | | |
|---|---|---|---|
| 2013/0100372 A1* | 4/2013 | Wu | G02B 6/0088 349/58 |
| 2014/0043559 A1* | 2/2014 | Lee | G02B 6/0081 349/58 |

(Continued)

FOREIGN PATENT DOCUMENTS

| | | |
|---|---|---|
| CN | 107526217 A | 12/2017 |
| CN | 207148477 U | 3/2018 |
| TW | I301917 B | 10/2008 |

*Primary Examiner* — Gerald J Sufleta, II (57) ABSTRACT

A housing for a display module, a display module, and an assembly method of the display module are provided. The housing includes a main body and a cover plate. The main body includes: a bottom plate; a back plate, a first side plate and a second side plate located on a same side of the back plate; first support limit portions, spaced apart from the bottom plate in a direction perpendicular to the bottom plate, respectively provided on a surface of the first side plate that faces the second side plate and provided on a surface of the second side plate that faces the first side plate; a first slot, located between the bottom plate and the first support limit portions; a first opening, opposite to the back plate; and a second opening, opposite to the bottom plate. The cover plate is detachably mounted at the first opening.

19 Claims, 3 Drawing Sheets

(56) References Cited

U.S. PATENT DOCUMENTS

| | | | |
|---|---|---|---|
| 2016/0091659 A1* | 3/2016 | Nian | G02B 6/0088 |
| | | | 349/61 |
| 2017/0184781 A1* | 6/2017 | Jin | G02B 6/0055 |
| 2018/0022215 A1* | 1/2018 | Tomaru | G02B 6/0088 |
| | | | 362/23.14 |
| 2018/0231710 A1* | 8/2018 | Snijkers | G02B 6/0088 |
| 2018/0292603 A1* | 10/2018 | Yu | G02B 6/0091 |
| 2018/0356681 A1* | 12/2018 | Wang | G02F 1/133528 |
| 2019/0146145 A1* | 5/2019 | Gu | G02B 6/0053 |
| | | | 362/607 |
| 2019/0212489 A1* | 7/2019 | Xu | G02B 6/0025 |
| 2019/0271880 A1* | 9/2019 | Li | G02F 1/133308 |
| 2019/0369324 A1* | 12/2019 | Ma | G02B 6/0088 |
| 2020/0026126 A1* | 1/2020 | Liu | G02F 1/133608 |
| 2020/0241191 A1* | 7/2020 | Chu | G02B 6/0031 |
| 2020/0341187 A1* | 10/2020 | Li | G02B 6/0065 |

* cited by examiner

HOUSING FOR DISPLAY MODULE, DISPLAY MODULE AND ASSEMBLY METHOD OF DISPLAY MODULE

The present application claims priority of Chinese Patent Application No. 201821610622.6 filed on Sep. 30, 2018, the disclosure of which is incorporated herein by reference in its entirety as part of the present application.

TECHNICAL FIELD

Embodiments of the present disclosure relate to a housing for a display module, a display module, and an assembly method of the display module.

BACKGROUND

A display module is an important component of a liquid crystal display, and includes a backlight module and a liquid crystal panel. The backlight module is divided into a backlight module of a side-lit type and a backlight module of a direct-lit type, both of which have advantages and disadvantages per se. At present, with continuous development and maturity of the technology of a light guide plate, the backlight module of the side-lit type has been more and more emphasized because it is more suitable for an ultra-thin development trend of the liquid crystal display.

Therefore, a current mainstream display module comprises the liquid crystal panel and the backlight module of the side-lit type. The backlight module of the side-lit type includes a light source, a light guide plate, a reflective plate and an optical film; the light source directly faces a light incident surface of the light guide plate; light emitted by the light source passes through the light guide plate and the optical film, and then is irradiated onto the liquid crystal panel; and the reflective plate serves to reflect a portion of light leaking from a bottom of the light guide plate back to the light guide plate. For example, the backlight module of the side-lit type is assembled in a mode of: firstly fixing the light source to a side surface of an L-shaped back plate; then placing the reflective plate on a bottom surface of the L-shaped back plate; sequentially placing the light guide plate and the optical film on the reflective plate; then packaging the above-described respective components within a mold frame to fix positions of the respective components; next, placing the liquid crystal panel above the mold frame; assembling the above-described respective components together with the liquid crystal panel through a middle frame; and finally placing them together within a front frame, so as to form the display module. It can be seen that, the assembly mode of the display module has problems such as cumbersome assembly process, high assembly difficulty, and high costs in labor and assembly component, which results in lower production efficiency and higher production costs.

SUMMARY

According to embodiments of the disclosure, a housing for a display module is provided. The housing comprises a main body and a cover plate. The main body includes: a bottom plate; a back plate, a first side plate and a second side plate that are located on a same side of the back plate, the first side plate and the second side plate being opposite to each other, and the back plate being located between the first side plate and the second side plate; first support limit portions, spaced apart from the bottom plate in a direction perpendicular to the bottom plate, respectively provided on a surface of the first side plate that faces the second side plate to protrude from the first side plate and provided on a surface of the second side plate that faces the first side plate to protrude from the second side plate; a first slot, located between the bottom plate and the first support limit portions; a first opening, opposite to the back plate; and a second opening, opposite to the bottom plate. The cover plate is detachably mounted at the first opening.

For example, the main body includes: second support limit portions, located on a side of the first support limit portions that is away from the bottom plate, respectively provided on the surface of the first side plate that faces the second side plate to protrude from the first side plate and provided on the surface of the second side plate that faces the first side plate to protrude from the second side plate; and a second slot, located between the first support limit portions and the second support limit portions.

For example, the main body includes: limit portions, located on a side of the second support limit portions that is away from the bottom plate, respectively provided on the surface of the first side plate that faces the second side plate to protrude from the first side plate and provided on the surface of the second side plate that faces the first side plate to protrude from the second side plate; and a third slot, located between the second support limit portions and the limit portions.

For example, the first support limit portion, the second support limit portion and the limit portion that are provided on the surface of the first side plate that faces the second side plate are integral with the first side plate; and the first support limit portion, the second support limit portion and the limit portion that are provided on the surface of the second side plate that faces the first side plate are integral with the second side plate.

For example, each of the first support limit portion, the second support limit portion and the limit portion that are provided on the surface of the first side plate that faces the second side plate has a length protruding from the first side plate and being 2% to 4% of a distance between the first side plate and the second side plate; and each of the first support limit portion, the second support limit portion and the limit portion that are provided on the surface of the second side plate that faces the first side plate has a length protruding from the second side plate and being 2% to 4% of the distance between the first side plate and the second side plate.

For example, the first support limit portion, the second support limit portion and the limit portion that are provided on the surface of the first side plate that faces the second side plate have an equal length protruding from the first side plate; and the first support limit portion, the second support limit portion and the limit portion that are provided on the surface of the second side plate that faces the first side plate have an equal length protruding from the second side plate.

For example, a distance from the first support limit portion provided on the surface of the first side plate that faces the second side plate to the bottom plate is equal to a distance from the first support limit portion provided on the surface of the second side plate that faces the first side plate to the bottom plate; a distance from the second support limit portion provided on the surface of the first side plate that faces the second side plate to the bottom plate is equal to a distance from the second support limit portion provided on the surface of the second side plate that faces the first side plate to the bottom plate; and a distance from the limit portion provided on the surface of the first side plate that faces the second side plate to the bottom plate is equal to a distance from the limit portion provided on the surface of the second side plate that faces the first side plate to the bottom plate.

For example, the cover plate is connected with the main body at the first opening by snaps or bolts.

According to the embodiments of the disclosure, a display module is provided. The display module comprises the housing as described above and a backlight module. The backlight module includes a light guide plate, and the light guide plate is located in the first slot.

For example, the backlight module further includes a reflective plate; the light guide plate and the reflective plate are located in the first slot; the reflective plate is located between the light guide plate and the bottom plate; and a height of the first slot is matched to a sum of a thickness of the reflective plate and a thickness of the light guide plate.

For example, the main body includes: second support limit portions, located on a side of the first support limit portions that is away from the bottom plate, respectively provided on the surface of the first side plate that faces the second side plate to protrude from the first side plate and provided on the surface of the second side plate that faces the first side plate to protrude from the second side plate; and a second slot, located between the first support limit portions and the second support limit portions. The backlight module includes an optical film, the optical film is located in the second slot, and a height of the second slot is matched to a thickness of the optical film.

For example, the main body includes: limit portions, located on a side of the second support limit portions that is away from the bottom plate, respectively provided on the surface of the first side plate that faces the second side plate to protrude from the first side plate and provided on the surface of the second side plate that faces the first side plate to protrude from the second side plate; and a third slot, located between the second support limit portions and the limit portions. The display module comprises a display panel, the display panel is located in the third slot, and a height of the third slot is matched to a thickness of the display panel.

For example, the display panel includes a display region and a non-display region located outside the display region; orthogonal projections of the first support limit portion, the second support limit portion and the limit portion that are provided on the surface of the first side plate that faces the second side plate on the display panel are located in the non-display region; orthogonal projections of the first support limit portion, the second support limit portion and the limit portion that are provided on the surface of the second side plate that faces the first side plate on the display panel are located in the non-display region; and the second opening exposes the display region.

For example, the backlight module includes a light source, and the light source is provided on a surface of the cover plate that faces the first opening and directly faces a light incident surface of the light guide plate.

According to the embodiments of the disclosure, an assembly method of a display module is provided. The display module comprises the housing as described above and a backlight module. The backlight module includes a light guide plate; the method comprises: inserting the light guide plate into the first slot from the first opening along a direction parallel to the bottom plate.

For example, the backlight module further includes a reflective plate, the method comprises: stacking the light guide plate on the reflective plate, and then inserting the light guide plate and the reflective plate into the first slot from the first opening along the direction parallel to the bottom plate so that the reflective plate is located between the light guide plate and the bottom plate.

For example, the main body includes: second support limit portions, located on a side of the first support limit portions that is away from the bottom plate, respectively provided on a surface of the first side plate that faces the second side plate to protrude from the first side plate and provided on a surface of the second side plate that faces the first side plate to protrude from the second side plate; and a second slot, located between the first support limit portions and the second support limit portions. The backlight module includes an optical film; the method comprises: inserting the optical film into the second slot from the first opening along the direction parallel to the bottom plate.

For example, the main body includes: limit portions, located on a side of the second support limit portions that is away from the bottom plate, respectively provided on the surface of the first side plate that faces the second side plate to protrude from the first side plate and provided on the surface of the second side plate that faces the first side plate to protrude from the second side plate; and a third slot, located between the second support limit portions and the limit portions. The display module comprises a display panel; the method comprises: inserting the display panel into the third slot from the first opening along the direction parallel to the bottom plate.

For example, the backlight module includes a light source; the method comprises: fixing the light source on a surface of the cover plate that faces the first opening; after inserting the light guide plate into the first slot, inserting the optical film into the second slot and inserting the display panel into the third slot, mounting the cover plate at the first opening so that the light source directly faces a light incident surface of the light guide plate.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Unless otherwise defined, the technical terms or scientific terms here should be of general meaning as understood by those ordinarily skilled in the art. In the descriptions and claims of the present disclosure, expressions such as "first", "second" and the like do not denote any order, quantity, or importance, but rather are used for distinguishing different components. Expressions such as "include" or "comprise" and the like denote that elements or objects appearing before the words of "include" or "comprise" cover the elements or the objects enumerated after the words of "include" or "comprise" or equivalents thereof, not exclusive of other elements or objects. Expressions such as "connect" or "interconnect" and the like are not limited to physical or mechanical connections, but may include electrical connections, whether direct or indirect. Expressions such as "up", "down", "left", "right" and the like are only used for expressing relative positional relationship, the relative positional relationship may be correspondingly changed in the case that the absolute position of a described object is changed.

As shown in FIG. 1a to FIG. 3, embodiments of the present disclosure provide a housing for a display module; the housing comprises a main body 100 and a cover plate 400, the main body includes a bottom plate 101, a back plate 102, a first side plate 103 and a second side plate 104 opposite to each other, a first opening (i.e., a side opening) opposite to the back plate 102, and a second opening (i.e., a top opening) opposite to the bottom plate 101. The back plate 102, the first side plate 103 and the second side plate 104 are located on a same side of the bottom plate 101, and the back plate 102 is located between the first side plate 103 and the second side plate 104. The cover plate 400 is detachably mounted at the first opening; and therefore, it can be understood that the cover plate 400 matches with the first opening in size.

Further, as shown in FIG. 1a to FIG. 3, the main body 100 includes first support limit portions 105, spaced apart from the bottom plate 101 in a direction perpendicular to the bottom plate 101, respectively provided on a surface of the first side plate 103 that faces the second side plate 104 to protrude from the first side plate 103 and provided on a surface of the second side plate 104 that faces the first side plate 103 to protrude from the second side plate 104; and the main body 100 further includes a first slot 107, located between the bottom plate 101 and the first support limit portions 105. For example, a distance from the first support limit portion 105 provided on the surface of the first side plate 103 that faces the second side plate 104 to the bottom plate 101 is equal to a distance from the first support limit portion 105 provided on the surface of the second side plate 104 that faces the first side plate 103 to the bottom plate 101, so that the first slot 107 has an equal height. It should be noted that, the height of the first slot 107 is a size of the first slot 107 in the direction perpendicular to the bottom plate 101.

For example, an optical component of the display module is inserted into the main body 100 of the housing directly from the first opening (i.e., the side opening). For example, the display module includes a backlight module and a display panel 300; the display panel 300 is, for example, a liquid crystal display panel; the backlight module is inserted into the first slot 107 directly from the first opening; and the display panel 300 is inserted into the main body 100 directly from the first opening and placed on the first support limit portions 105. In this way, a simple assembly process with a low assembly difficulty as well as low costs in labor and assemble components is implemented, so as to improve production efficiency of the display module and reduce production costs.

Further, as shown in FIG. 1a to FIG. 3, the main body 100 includes: second support limit portions 106, located on a side of the first support limit portions 105 that is away from the bottom plate 101, respectively provided on the surface of the first side plate 103 that faces the second side plate 104 to protrude from the first side plate 103 and provided on the surface of the second side plate 104 that faces the first side plate 103 to protrude from the second side plate 104; and the main body 100 further includes a second slot 108, located between the first support limit portions 105 and the second support limit portions 106. For example, a distance from the second support limit portion 106 provided on the surface of the first side plate 103 that faces the second side plate 104 to the bottom plate 101 is equal to a distance from the second support limit portion 106 provided on the surface of the second side plate 104 that faces the first side plate 103 to the bottom plate 101, so that the second slot 108 has an equal height. It should be noted that, the height of the second slot 108 is a size of the second slot 108 in the direction perpendicular to the bottom plate 101.

For example, the backlight module includes a light guide plate 201 and an optical film 203. For example, the light guide plate 201 is inserted into the first slot 107 directly from the first opening, the optical film 203 is inserted into the second slot 108 directly from the first opening, and the display panel 300 is inserted into the main body 100 directly from the first opening and placed on the second support limit portions 106. In this way, a simple assembly process with a low assembly difficulty as well as low costs in labor and assembling components is implemented, so as to improve production efficiency of the display module and reduce production costs.

For example, the backlight module further includes a reflective plate 202; the reflective plate 202 is inserted into the first slot 107 directly from the first opening together with the light guide plate 201; and the reflective plate 202 is located between the light guide plate 201 and the bottom plate 101.

Further, as shown in FIG. 1a to FIG. 3, the main body 100 includes: limit portions 109, located on a side of the second support limit portions 106 that is away from the bottom plate 101, respectively provided on the surface of the first side plate 103 that faces the second side plate 104 to protrude from the first side plate 103 and provided on the surface of the second side plate 104 that faces the first side plate 103 to protrude from the second side plate 104; and the main body 100 further includes: a third slot 110, located between the second support limit portions 106 and the limit portions 109. For example, a distance from the limit portion 109 provided on the surface of the first side plate 103 that faces the second side plate 104 to the bottom plate 101 is equal to a distance from the limit portion 109 provided on the surface of the second side plate 104 that faces the first side plate 103 to the bottom plate 101, so that the third slot 110 has an equal height. It should be noted that, the height of the third slot 110 is a size of the third slot 110 in the direction perpendicular to the bottom plate 101.

For example, the first slot 107, the second slot 108 and the third slot 110 are respectively used for receiving and fixing the optical components of the display module. For example, with the first support limit portion 105 as an example, it is referred to as the "support limit portion" because it not only supports the optical component thereon, but also limits a position of an optical component below it.

Figure 2:
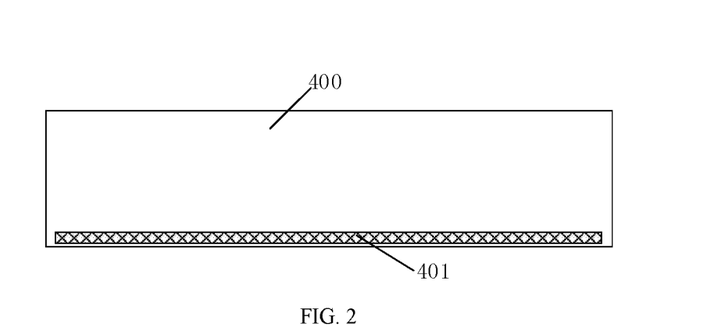
FIG. 2 is a schematic diagram of a cover plate of the housing for the display module provided by the embodiments of the present disclosure.
Figure 3:
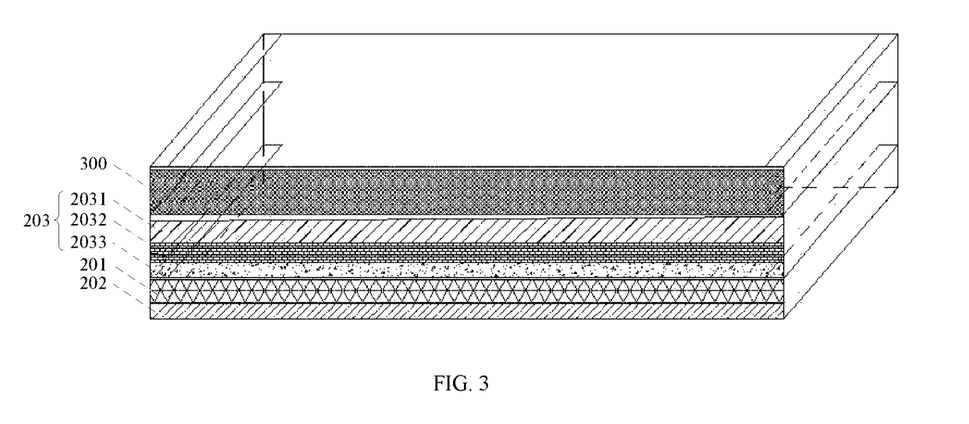
FIG. 3 is a schematic diagram of the display module provided by the embodiments of the present disclosure.

For example, the backlight module includes a light source 401, and the light source 401 is provided on a surface of the cover plate 400 that faces the first opening, and directly faces a light incident surface of the light guide plate 201.

According to the housing provided by the embodiments of the present disclosure, during the display module is assembled, the optical components are inserted into the main body 100 of the housing directly from the first opening (i.e., the side opening) in a drawer manner. For example, the light guide plate 201 is stacked on the reflective plate 202, then the light guide plate 201 and the reflective plate 202 as a whole are inserted from the first opening (i.e., the side opening) into the first slot 107 in the main body 100 that is formed by the bottom plate 101 and the first support limit portions 105; the optical film 203 is inserted from the first opening (i.e., the side opening) into the second slot 108 in the main body 100 that is formed by the first support limit portions 105 and the second support limit portions 106; the display panel 300, for example, the liquid crystal panel, is inserted from the first opening (i.e., the side opening) into the third slot 110 in the main body 100 that is formed by the second support limit portions 106 and the limit portions 109; and then the cover plate 400 on which the light source 401 is fixed is mounted at the first opening (i.e., the side opening) of the main body 100; and thus the entire assembly process of the display module is implemented. It can be understood that, the order of the combination and insertion of the light guide plate 201 and the reflective plate 202, the insertion of the optical film 203 and the insertion of the liquid crystal panel 300 is not limited, and the above-described order is merely an example.

In the housing provided by the embodiments of the present disclosure, the light source 401 directly faces the light incident surface of the light guide plate 201 after the cover plate 400 on which the light source 401 is fixed is mounted the first opening; light emitted by the light source is irradiated onto the display panel 300, for example, the liquid crystal panel, after passing through the light guide plate 201 and the optical film 203; the content displayed by the display panel 300, for example, the liquid crystal panel, is viewed through the second opening; and the reflective plate 202 reflects a portion of light leaking from the bottom of the light guide plate 201 back to the light guide plate 201, so as to improve a utilization rate of light. It can be understood that, a position where the light source 401 is fixed on the surface of the cover plate 400 that faces the first opening is adjusted so that the light source 401 directly faces the light incident surface of the light guide plate 201 if the cover plate 400 is mounted at the first opening of the main body 100 and covers the first opening of the main body 100.

Figure 1A:
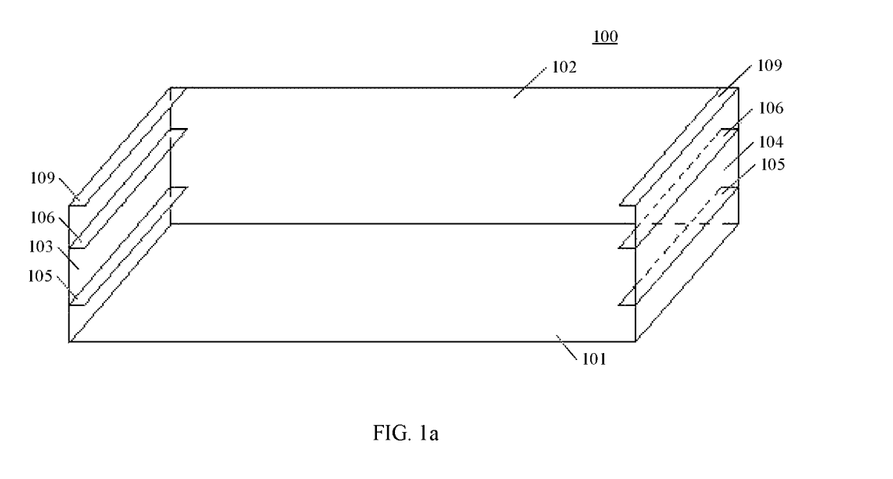
FIG. 1a is a stereoscopic schematic diagram of a main body of a housing for a display module provided by embodiments of the present disclosure.
Figure 1B:
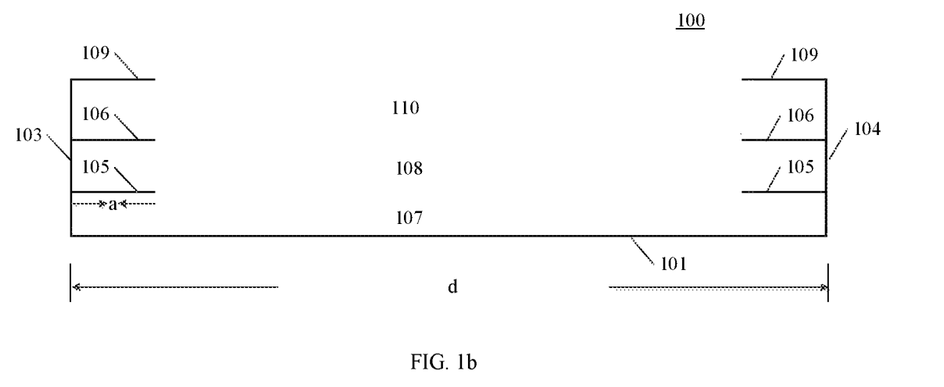
FIG. 1b is a front view of the main body of the housing for the display module provided by the embodiments of the present disclosure.

For example, the first support limit portion 105, the second support limit portion 106 and the limit portion 109 that are provided on the surface of the first side plate 103 that faces the second side plate 104 are integral with the first side plate 103. Of course, the embodiments of the present disclosure are not limited thereto, and the first support limit portion 105, the second support limit portion 106 and the limit portion 109 that are provided on the surface of the first side plate 103 that faces the second side plate 104 may be separately fabricated and then fixed to the first side plate 103.

For example, the first support limit portion 105, the second support limit portion 106 and the limit portion 109 that are provided on the surface of the second side plate 104 that faces the first side plate 103 are integral with the second side plate 104. Of course, the embodiments of the present disclosure are not limited thereto, and the first support limit portion 105, the second support limit portion 106 and the limit portion 109 that are provided on the surface of the second side plate 104 that faces the first side plate 103 may be separately fabricated and then fixed to the second side plate 104.

For example, each of the first support limit portions 105, each of the second support limit portions 106 and each of the limit portions 106 has a length extending toward the opposite side plate, which is 2% to 4% of a distance between the two side plates. For example, as shown in FIG. 2, with the first support limit portion 105 provided on the first side plate 103 as an example, a length thereof extending to the second side plate 104 is denoted as a, a distance between the first side plate 103 and the second side plate 104 is denoted as d, and a is 2% to 4% of d. Such a structure ensures that the light emitted from the light source 401 is not shielded in a process of passing through the respective optical components and then being irradiated onto the liquid crystal panel 300, and that a display region of the liquid crystal panel 300 is not shielded. For example, each of the first support limit portions 105, each of the second support limit portions 106 and each of the limit portions 109 have an equal length extending toward the opposite side plate, which facilitates fabrication of the main body 100.

For example, the cover plate 400 is connected with the main body 100 at the first opening by snaps or bolts. With such a structure, the cover plate is firmly mounted to the main body 100 conveniently after the respective optical components are inserted. It can be understood that, the above-described structure is only an exemplary structure, and the cover plate may be connected with the main body 100 at the first opening in other detachable connection manner, which will not be limited in the embodiments of the present disclosure.

As shown in FIG. 1a to FIG. 3, the embodiments of the present disclosure provide a display module; the display panel comprises the display panel 300, for example, the liquid crystal panel, and the backlight module of the side-lit type; the backlight module of the side-lit type includes the light source 401, the light guide plate 201, the reflective plate 202 and the optical film 203; the display module further comprises the above-described housing. The light source 401 is fixed on a surface of the cover plate 400 that faces the first opening, the reflective plate 202 and the light guide plate 201 located above the reflective plate 202 are located in the first slot 107 configured by the bottom plate 101 and the first support limit portions 105, the optical film 203 is located in the second slot 108 configured by the first support limit portions 105 and the second support limit portions 106, and the display panel 300, for example, the liquid crystal panel is located in the third slot 110 configured by the second support limit portions 106 and the limit portions 109.

With the display module provided by the embodiments of the present disclosure, a simple assembly process with a low assembly difficulty as well as low costs in labor and assembling components is implemented, so as to improve production efficiency of the display module and reduce production costs.

For example, the height of the first slot 107 between the bottom plate 101 and the first support limit portions 105 is matched to a sum of a thickness of the reflective plate 202 and a thickness of the light guide plate 201; the height of the second slot 108 between the first support limit portions 105 and the second support limit portions 106 is matched to a thickness of the optical film 203; and the height 110 of the third slot between the second support limit portions 106 and the limit portions 109 is matched to a thickness of the display panel 300, for example, the liquid crystal panel. With such a structure, the liquid crystal panel 300 and the respective optical components are firmly fixed after being inserted into the housing. It can be understood that, the expression "matched to" is understood as "completely consistent with", but it may be understood as "slightly larger than" in order to balance ease of insertion and firmness after insertion.

For example, the optical film 203 includes a prism sheet and a diffusion sheet 2031 located on the prism sheet. Further, the prism sheet includes an upper prism sheet 2032 close to the diffusion sheet 2031 and a lower prism sheet 2033 close to the light guide plate 201, for enhancing center luminance of light; and the diffusion sheet 2031 functions for improving uniformity of light.

For example, the light source 401 is fixed to the cover plate 400 by bonding. For example, the light source 401 is fixed to the cover plate 400 by a thermal adhesive. It can be understood that, the above-described structure is only an exemplary structure, and the light source 401 may be fixed to the cover plate 400 in other fixed connection manner, which will not be limited in the embodiments of the present disclosure. For example, the light source 401 is a light emitting diode (LED) strip.

Figure 4:
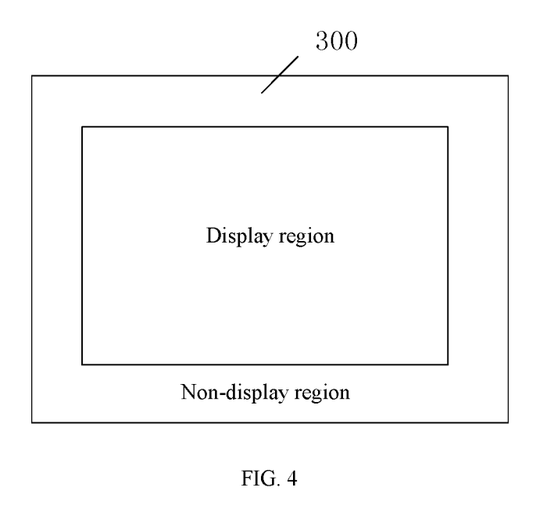
FIG. 4 is a schematic diagram of a display panel of the display module provided by the embodiments of the present disclosure.

For example, as shown in FIG. 4, the display panel includes a display region and a non-display region located outside the display region; orthogonal projections of the first support limit portion 105, the second support limit portion 106 and the limit portion 109 that are provided on the surface of the first side plate 103 that faces the second side plate 104 on the display panel 300 are located in the non-display region; orthogonal projections of the first support limit portion 105, the second support limit portion 106 and the limit portion 109 that are provided on a surface of the second side plate 104 that faces the first side plate 103 on the display panel 300 are located in the non-display region; and the second opening (i.e., the top opening) exposes the display region. Thus, it is ensured that light emitted by the light source 401 is not shielded in a process of passing through the respective optical components and then being irradiated onto the liquid crystal panel 300, and that the display region of the liquid crystal panel 300 is not shielded.

Figure 5:
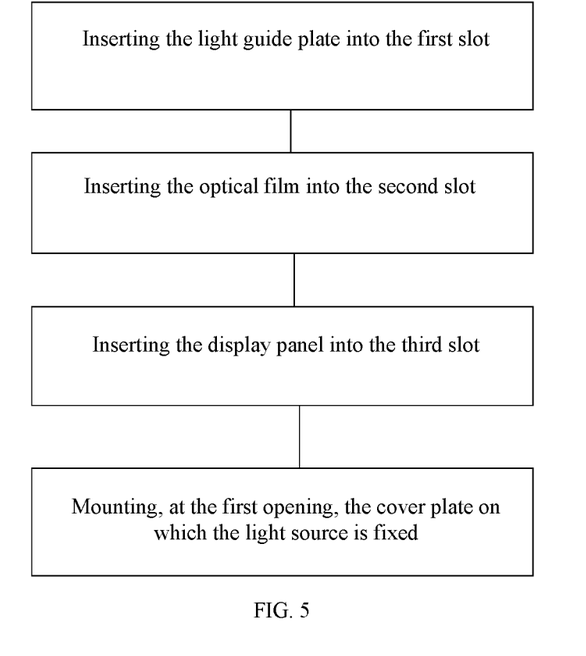
FIG. 5 is a flow chart of an assembly method of a display module provided by the embodiments of the present disclosure.

As shown in FIG. 5, the embodiments of the present disclosure further provides an assembly method of the display module; the method comprises: inserting the light guide plate 201 into the first slot 107 from the first opening along a direction parallel to the bottom plate 101.

For example, the method further comprises: stacking the light guide plate 201 on the reflective plate 202, and then inserting the light guide plate 201 and the reflective plate 202 into the first slot 107 from the first opening along the direction parallel to the bottom plate 101, the reflective plate 202 is located between the light guide plate 201 and the bottom plate 101.

For example, the method further comprises: inserting the optical film 203 into the second slot 108 from the first opening along the direction parallel to the bottom plate 101.

For example, the method further comprises: inserting the display panel 300 into the third slot 110 from the first opening along the direction parallel to the bottom plate 101.

By using the above-described method, the optical components are inserted into the main body 100 of the housing directly from the first opening (i.e., a side opening) in the drawer manner, so that a simple assembly process with a low assembly difficulty as well as low costs in labor and assembling components is implemented, so as to improve production efficiency of the display module and reduce production costs.

For example, the method further comprises: fixing the light source 401 on the surface of the cover plate 400 that faces the first opening; after inserting the light guide plate 201 into the first slot 107, inserting the optical film 203 into the second slot 108 and inserting the display panel 300 into the third slot 110, mounting the cover plate 400 at the first opening, so that the light source 401 directly faces the light incident surface of the light guide plate 201.

The foregoing embodiments merely are exemplary embodiments of the disclosure, and not intended to define the scope of the disclosure, and the scope of the disclosure is determined by the appended claims.

The invention claimed is:

1. A housing for a display module, comprising a main body and a cover plate, wherein
the main body includes:
  a bottom plate;
  a back plate, a first side plate and a second side plate that are located on a same side of the back plate, the first side plate and the second side plate being opposite to each other, and the back plate being located between the first side plate and the second side plate;
  first support limit portions, spaced apart from the bottom plate in a direction perpendicular to the bottom plate, respectively provided on a surface of the first side plate that faces the second side plate to protrude from the first side plate and provided on a surface of the second side plate that faces the first side plate to protrude from the second side plate;
  a first slot, located between the bottom plate and the first support limit portions;
  a first opening, opposite to the back plate; and
  a second opening, opposite to the bottom plate, and
the cover plate is detachably mounted at the first opening.

2. The housing according to claim 1, wherein the main body includes:
  second support limit portions, located on a side of the first support limit portions that is away from the bottom plate, respectively provided on the surface of the first side plate that faces the second side plate to protrude from the first side plate and provided on the surface of the second side plate that faces the first side plate to protrude from the second side plate; and
  a second slot, located between the first support limit portions and the second support limit portions.

3. The housing according to claim 2, wherein the main body includes:
  limit portions, located on a side of the second support limit portions that is away from the bottom plate, respectively provided on the surface of the first side plate that faces the second side plate to protrude from the first side plate and provided on the surface of the second side plate that faces the first side plate to protrude from the second side plate; and a third slot, located between the second support limit portions and the limit portions.

4. The housing according to claim 3, wherein
the first support limit portion, the second support limit portion and the limit portion that are provided on the surface of the first side plate that faces the second side plate are integral with the first side plate; and
the first support limit portion, the second support limit portion and the limit portion that are provided on the surface of the second side plate that faces the first side plate are integral with the second side plate.

5. The housing according to claim 3, wherein
each of the first support limit portion, the second support limit portion and the limit portion that are provided on the surface of the first side plate that faces the second side plate has a length protruding from the first side plate and being 2% to 4% of a distance between the first side plate and the second side plate; and
each of the first support limit portion, the second support limit portion and the limit portion that are provided on the surface of the second side plate that faces the first side plate has a length protruding from the second side plate and being 2% to 4% of the distance between the first side plate and the second side plate.

6. The housing according to claim 5, wherein
the first support limit portion, the second support limit portion and the limit portion that are provided on the surface of the first side plate that faces the second side plate have an equal length protruding from the first side plate; and
the first support limit portion, the second support limit portion and the limit portion that are provided on the surface of the second side plate that faces the first side plate have an equal length protruding from the second side plate.

7. The housing according to claim 3, wherein
a distance from the first support limit portion provided on the surface of the first side plate that faces the second side plate to the bottom plate is equal to a distance from the first support limit portion provided on the surface of the second side plate that faces the first side plate to the bottom plate;
a distance from the second support limit portion provided on the surface of the first side plate that faces the second side plate to the bottom plate is equal to a distance from the second support limit portion provided on the surface of the second side plate that faces the first side plate to the bottom plate; and
a distance from the limit portion provided on the surface of the first side plate that faces the second side plate to the bottom plate is equal to a distance from the limit portion provided on the surface of the second side plate that faces the first side plate to the bottom plate.

8. The housing according to claim 1, wherein the cover plate is connected with the main body at the first opening by snaps or bolts.

9. A display module, comprising the housing according to claim 1 and a backlight module, wherein the backlight module includes a light guide plate, and the light guide plate is located in the first slot.

10. The display module according to claim 9, wherein the backlight module further includes a reflective plate; the light guide plate and the reflective plate are located in the first slot; the reflective plate is located between the light guide plate and the bottom plate; and a height of the first slot is matched to a sum of a thickness of the reflective plate and a thickness of the light guide plate.

11. The display module according to claim 9, wherein the main body includes:
second support limit portions, located on a side of the first support limit portions that is away from the bottom plate, respectively provided on the surface of the first side plate that faces the second side plate to protrude from the first side plate and provided on the surface of the second side plate that faces the first side plate to protrude from the second side plate; and
a second slot, located between the first support limit portions and the second support limit portions, and
the backlight module includes an optical film, the optical film is located in the second slot, and a height of the second slot is matched to a thickness of the optical film.

12. The display module according to claim 11, wherein the main body includes:
limit portions, located on a side of the second support limit portions that is away from the bottom plate, respectively provided on the surface of the first side plate that faces the second side plate to protrude from the first side plate and provided on the surface of the second side plate that faces the first side plate to protrude from the second side plate; and
a third slot, located between the second support limit portions and the limit portions,
the display module comprises a display panel, the display panel is located in the third slot, and a height of the third slot is matched to a thickness of the display panel.

13. The display module according to claim 12, wherein
the display panel includes a display region and a non-display region located outside the display region;
orthogonal projections of the first support limit portion, the second support limit portion and the limit portion that are provided on the surface of the first side plate that faces the second side plate on the display panel are located in the non-display region;
orthogonal projections of the first support limit portion, the second support limit portion and the limit portion that are provided on the surface of the second side plate that faces the first side plate on the display panel are located in the non-display region; and
the second opening exposes the display region.

14. The display module according to claim 13, wherein the backlight module includes a light source, and the light source is provided on a surface of the cover plate that faces the first opening and directly faces a light incident surface of the light guide plate.

15. An assembly method of a display module, the display module comprising the housing according to claim 1 and a backlight module, wherein
the backlight module includes a light guide plate;
the method comprises: inserting the light guide plate into the first slot from the first opening along a direction parallel to the bottom plate.

16. The assembly method according to claim 15, wherein
the backlight module further includes a reflective plate,
the method comprises: stacking the light guide plate on the reflective plate, and then inserting the light guide plate and the reflective plate into the first slot from the first opening along the direction parallel to the bottom plate so that the reflective plate is located between the light guide plate and the bottom plate.

17. The assembly method according to claim 15, wherein the main body includes:

second support limit portions, located on a side of the first support limit portions that is away from the bottom plate, respectively provided on a surface of the first side plate that faces the second side plate to protrude from the first side plate and provided on a surface of the second side plate that faces the first side plate to protrude from the second side plate; and a second slot, located between the first support limit portions and the second support limit portions, and the backlight module includes an optical film;

the method comprises: inserting the optical film into the second slot from the first opening along the direction parallel to the bottom plate.

18. The assembly method according to claim 17, wherein the main body includes:

limit portions, located on a side of the second support limit portions that is away from the bottom plate, respectively provided on the surface of the first side plate that faces the second side plate to protrude from the first side plate and provided on the surface of the second side plate that faces the first side plate to protrude from the second side plate; and a third slot, located between the second support limit portions and the limit portions, the display module comprises a display panel;

the method comprises: inserting the display panel into the third slot from the first opening along the direction parallel to the bottom plate.

19. The assembly method according to claim 18, wherein the backlight module includes a light source;

the method comprises:

fixing the light source on a surface of the cover plate that faces the first opening;

after inserting the light guide plate into the first slot, inserting the optical film into the second slot and inserting the display panel into the third slot, mounting the cover plate at the first opening so that the light source directly faces a light incident surface of the light guide plate.

\* \* \* \* \*